(12) United States Patent
Wade et al.

(10) Patent No.: US 8,738,883 B2
(45) Date of Patent: May 27, 2014

(54) SNAPSHOT CREATION FROM BLOCK LISTS

(75) Inventors: Gregory L. Wade, San Jose, CA (US);
J. Mitchell Haile, Somerville, MA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 13/354,285

(22) Filed: Jan. 19, 2012

(65) Prior Publication Data

US 2012/0290802 A1 Nov. 15, 2012

Related U.S. Application Data

(60) Provisional application No. 61/434,201, filed on Jan. 19, 2011, provisional application No. 61/424,223, filed on Jan. 19, 2011.

(51) Int. Cl.
*G06F 12/00* (2006.01)
*G06F 3/06* (2006.01)

(52) U.S. Cl.
USPC .......... 711/170; 711/162; 711/E12.005; 714/6.1; 714/E11.117; 718/1

(58) Field of Classification Search
None
See application file for complete search history.

(56) References Cited

U.S. PATENT DOCUMENTS

| 7,447,854 | B1* | 11/2008 | Cannon | 711/162 |
| 7,743,028 | B1* | 6/2010 | Stringham et al. | 707/646 |
| 2003/0061456 | A1* | 3/2003 | Ofek et al. | 711/162 |
| 2003/0097611 | A1* | 5/2003 | Delaney et al. | 714/13 |
| 2005/0171979 | A1* | 8/2005 | Stager et al. | 707/200 |
| 2010/0077160 | A1* | 3/2010 | Liu et al. | 711/162 |
| 2011/0055499 | A1* | 3/2011 | Sasson et al. | 711/162 |
| 2012/0072659 | A1* | 3/2012 | Wade et al. | 711/112 |

* cited by examiner

*Primary Examiner* — Matthew Bradley
*Assistant Examiner* — Daniel Bernard

(57) ABSTRACT

A method of operating a data management system includes establishing a base state for a data storage volume, generating a list of blocks associated with the data storage volume that have changed, and creating a snapshot from the list of blocks.

12 Claims, 4 Drawing Sheets

SNAPSHOT CREATION FROM BLOCK LISTS

CROSS REFERENCE TO RELATED APPLICATIONS

This application claims the benefit of U.S. provisional application entitled "DATA MANAGEMENT SYSTEM" having Ser. No. 61/434,201 filed on Jan. 19, 2011, which is entirely incorporated herein by reference. This application also claims the benefit of U.S. provisional application entitled "DATA MANAGEMENT SYSTEM" having Ser. No. 61/434,223 filed on Jan. 19, 2011, which is entirely incorporated herein by reference.

TECHNICAL BACKGROUND

In virtual machine environments, a hypervisor running on a host hardware system creates a virtual system on which a guest operating system may execute. The virtual system includes a virtual storage volume on which the guest operating system stores its data. For example, the hypervisor may simulate a hard disk for the guest operating system that the hypervisor stores as a virtual disk file on the host system. Some hypervisors continually track and record changes to the virtual disk file in a changed block list.

A virtual storage volume within a virtual machine contains data items that need to be accessed. Unfortunately, accessing the underlying contents of a storage volume can be very resource-intensive, reducing the performance of a virtual machine and other operations within a virtual machine environment. A backup process in particular can typically be a very resource-intensive process.

A full backup of a large data set may take a long time to complete. On multi-tasking or multi-user systems, it may be desirable for data to be accessible and even written to while the particular storage volume is being backed up. Such a problem presents difficulties in maintaining data integrity and may introduce a version skew that could result in data corruption. For example, if a user moves a file into a directory that had already been backed up, then that file would be completely missing on the backup media, since the backup operation had already taken place before the addition of the file. Version skew may also cause corruption with files which change their size or contents underfoot while being read.

To avoid these issues, some systems may instead perform backups by taking snapshots, which are typically read-only copies of a data set frozen at a point in time. Advantageously, taking snapshots allows applications to continue writing to the underlying data and conserves system resources. For example, in some systems, once an initial snapshot of a data set is taken, subsequent snapshots may copy the changed data only, which consumes less disk capacity than if the full data set were repeatedly cloned.

OVERVIEW

Embodiments disclosed herein provide systems and methods for creating snapshots from a list of changed blocks. In a particular embodiment, a method provides establishing a base state for a data storage volume, generating a list of blocks associated with the data storage volume that have changed, and creating a snapshot from the list of blocks.

In some embodiments, the method further comprises restoring a recent state for the data storage volume by merging the snapshot and the base state.

In some embodiments, creating the snapshot from the list of blocks comprises synthesizing the snapshot from the list of blocks associated with the data storage volume that have changed.

In some embodiments, generating the list of blocks associated with the data storage volume that have changed comprises identifying changed data items within a secondary storage volume and correlating mapping table entries associated with the changed data items to bitmap entries associated with the data storage volume. Further, generating the list of blocks associated with the data storage volume that have changed may additionally comprise identifying changed blocks associated with the bitmap entries, and generating the list of blocks associated with the data storage volume based on the changed blocks.

In some embodiments, the list of blocks comprises a changed block list.

In some embodiments, the data storage volume comprises a virtual disk file and the secondary storage volume comprises a virtual drive.

In some embodiments, the virtual disk file comprises a virtual machine disk (VMDK) file format.

In another embodiment a data management system comprises a storage system and a processing system. The storage system is configured to store a data storage volume. The processing system is configured to establish a base state for the data storage volume, generate a list of blocks associated with the data storage volume that have changed, and create a snapshot from the list of blocks.

In another embodiment, one or more computer-readable media have program instructions stored thereon is provided for operating a data management system. The program instructions, when executed by the data management system, direct the data management system to establish a base state for the data storage volume, generate a list of blocks associated with the data storage volume that have changed, and create a snapshot from the list of blocks.

DETAILED DESCRIPTION

Methods, computer readable media, and systems are provided herein for creating a snapshot from a list of blocks in a data storage volume that have changed relative to a base state of the storage volume. Snapshots include markers, pointers, index data or the like which correspond to a selected subset of data that allow a computing system to track data that has been changed and should be included and accessible within the selected storage volume. For example, snapshots may be used to track changes to blocks in a primary storage volume and/or changes to data items in a secondary storage volume relative to a base state of the storage volumes at a given time. Such a configuration may allow a system to generate a changed block snapshot for the primary storage volume of changes made to data items in a secondary storage volume as the changes to the data items are made. This may be performed while still allowing users to access the data items on the secondary storage volume. Such configuration may allow for rapid backup and recovery of data items to the secondary storage volume as well as increased compatibility of the storage volumes across a variety of platforms.

In some examples, lists of blocks in a data storage volume that have changed relative to a base state of the data storage volume (hereinafter referred to as changed block lists) may also be synthesized based on which files in a secondary storage volume have been changed. Such a process may allow a user to obtain and utilize changed block lists from virtual machine environments or hypervisors that do not support changed block lists. Additionally, such a process may allow a system to avoid the resource overhead associated with obtaining changed block lists from virtual machine environments that do support changed block lists.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
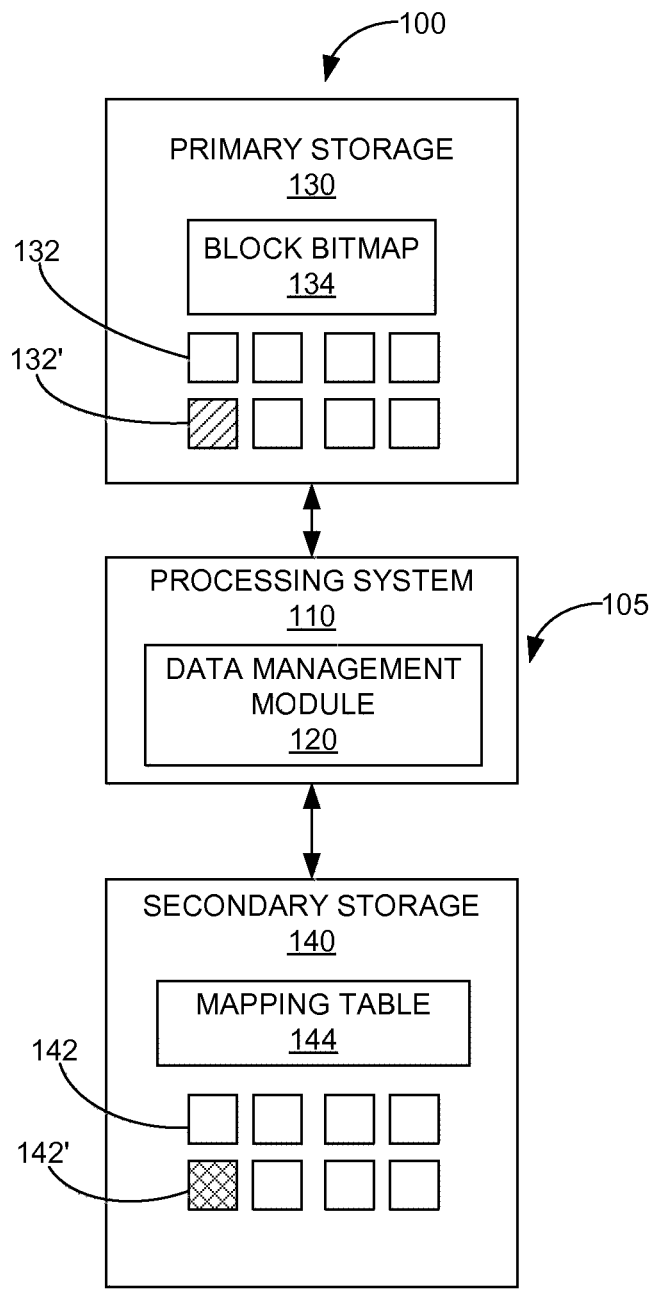
FIG. 1 is a block diagram that illustrates a data management system according to one example.

FIG. 1 illustrates an exemplary system 100 that includes a data management system 105. The data management system 105 could comprise any device or system capable of receiving storage instructions to transfer data between storage volumes. Accordingly, data management system 105 may comprise, for example, a computer, a server computer, a disk array, a virtual machine running on a computer, or some other type of storage system, including any combination or variation thereof.

The data management system 105 includes a processing system 110 and a data management module 120. The data management system 105 is configured to interact with a primary storage volume 130, and a secondary storage volume 140. The data management module 120 is implemented in the data management system 105 in order to manage data exchanges, transfers, and the like between the primary storage volume 130 and the secondary storage volume 140. In particular, as will be discussed in more detail, the data management module 120 is configured to analyze changes in the secondary storage volume 140 to generate a changed block list of corresponding changes to the primary storage volume 130.

The processing system 110 comprises any system or collection of systems capable of executing the data management module 120 to identify changes to data items 142 in the secondary storage volume 140. The processing system 110 could comprise a micro-processor, an application specific integrated circuit, a general purpose computer, a server computer, or any combination or variation thereof. The data management module 120 may comprise program instructions executable by processing system 110.

The primary and secondary storage volumes 130 and 140, respectively, may be any storage volumes capable of storing a volume of data. The secondary data volume 140 may itself be stored within another storage volume, such as primary storage volume 130. The blocks 132 may then include sections of the data volume in primary storage volume 130. Information about the blocks 130, such as the status (allocated, unallocated, associations, etc.) is maintained in a bitmap 134 stored on the primary storage volume 130.

As introduced, the secondary storage volume 140 includes the data items 142. Information about the data items 142 is maintained in a mapping table 144. In at least one example, the secondary storage volume 140 may comprise a virtual storage volume, such as a virtual drive. In this case, the data items 142 may be the virtual storage contents of a data volume in the secondary storage volume 140. Processing system 110 and/or the secondary storage volume 140 may additionally track data items 142 of the data volume in secondary storage volume 140 that have changed. In some examples, the primary storage volume 130 could also comprise a virtual storage volume, such as a virtual disk file.

In an example, a guest operating system may be executed within a virtual machine that contains a virtual disk drive. The guest operating system may further include a file system for storage of the volume data. In this case, data items may be requested by a user via a data item request. It should be understood that the user may be a human operator, as well as other software applications, hardware elements, or the like. As will be discussed in more detail hereinafter, changes to the data items may be used to generate a changed block list in one embodiment.

Figure 2:
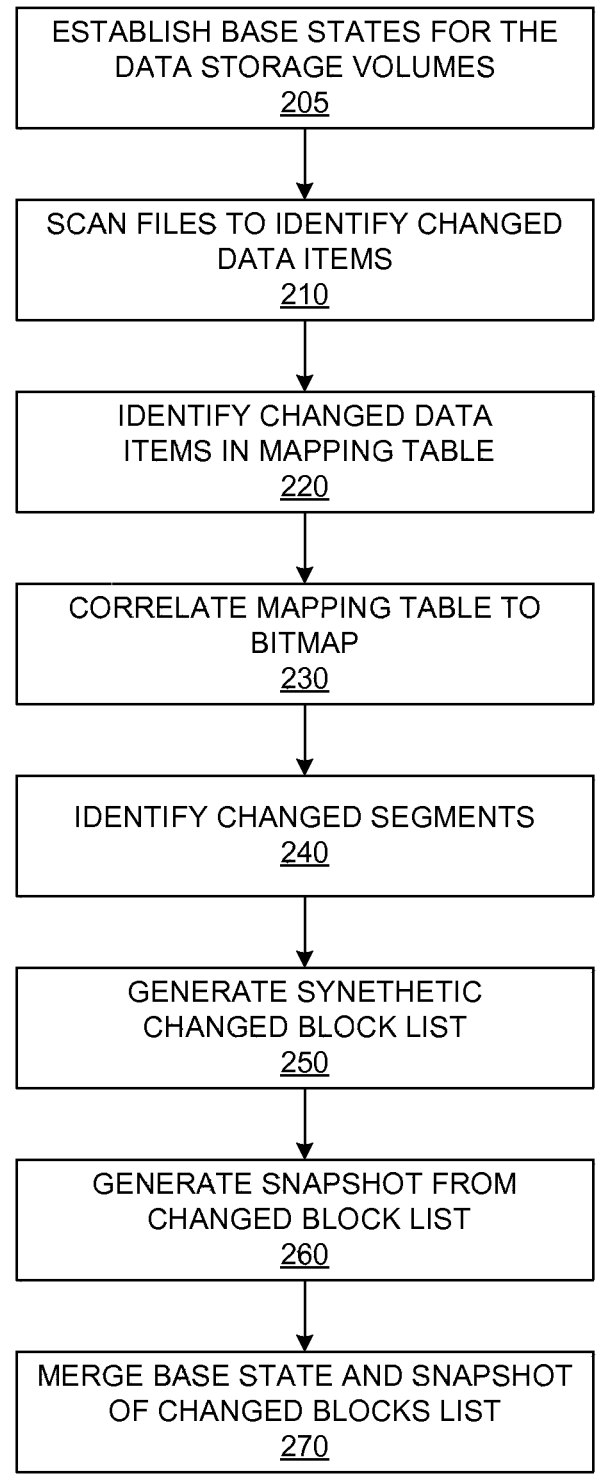
FIG. 2 is a flow diagram that illustrates an operation of a data management system.

FIG. 2 illustrates a method of operating a data management system according to one example. The method of FIG. 2 will be described with simultaneous reference to FIG. 1. As illustrated in FIGS. 1 and 2, the method begins at step 205 by establishing a base state for one or more of the data storage volumes. In at least one example, a base state for the primary storage volume 130 may be established by creating a snapshot of the primary storage volume 130.

After the base state has been established, a list of blocks associated with the data storage volume that have changed is generated (not shown). One example of how the list of blocks associated with primary storage volume 130 could be generated is provided below with respect to optional method steps 210 through 250, but one of skill in the art will understand that the list of blocks could also be generated automatically by data management system 105 in some examples.

At optional step 210, data items 142 in secondary storage volume 140 are scanned to identify the changed data items 142' in the secondary storage volume 140. This method step 210 may be performed on an ongoing basis as data items are changed relative to a base state of secondary storage volume 140.

Once the changed data items have been identified at optional step 210, the processing system 110 may then locate entries in the mapping table 144 that correspond to the changed data items 142' at optional step 220. The entries in the mapping table 144 of secondary storage volume 140 have corresponding entries in the block bitmap 134 of primary storage volume 130. Accordingly, at optional step 230, the data management module 120 correlates the entries in the mapping table 144 to the block bitmap 134.

Using these correlations, at optional step 240 the data management module 120 identifies the changed blocks 142' based on the correlations between the mapping table 144 and the block bitmap 134'. In this manner, changed blocks 132' in the primary storage volume 130 are identified.

The bitmap 134 contains information about the blocks 132. As a result, the bitmap 134 allows the data management module 120 to identify the changed blocks 132' at optional step 240 that correspond to the changed data items 142' as discussed above. Once the changed blocks 132' have been identified, the data management module 120 may then generate a synthetic list of the changed blocks at optional step 250. Accordingly, data management system 105 may be configured to generate a changed block list from virtual machine environments that do not generate changed block lists on their own.

The changed block list is then converted into a snapshot at step 260. In some examples, the snapshot is created by synthesizing the snapshot from a synthetic changed block list which is generated as discussed above with respect to optional steps 210 through 250. Generating the snapshot from the changed block list may allow a variety of processes to utilize the data associated with the changed block list in the form of the snapshot. As a result, the snapshot may allow additional computing devices to receive and process data as part of backup, restore, migration, or other processes, which may allow for increased flexibility in such processes.

In some examples, another optional step 270 may be utilized as part of a recovery process in which a snapshot of a base state of primary storage volume 130 and a snapshot created from the changed block list are merged. Merging the two snapshots may provide a data structure that may be treated as the full, updated version of the blocks corresponding to the secondary storage volume while reducing the overhead associated with processing the actual full secondary storage volume. For example, a recent state for a data storage volume may be restored by merging the snapshot created from the changed block list and the base state of the storage volume.

Figure 3:
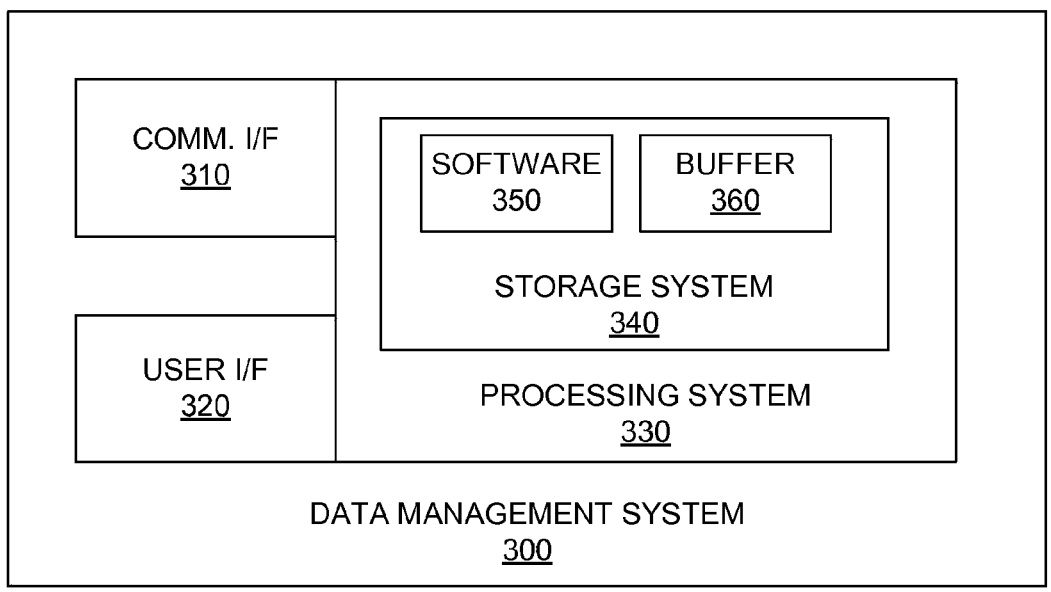
FIG. 3 is a block diagram that illustrates a data management system according to one example.

FIG. 3 is a block diagram that illustrates a data management system 300 according to one example. Data management system 300 provides an example of data management system 105, but system 105 could use alternative configurations. Data management system 300 and the associated description below are intended to provide a brief, general description of a suitable computing environment in which the method described in FIG. 2 may be implemented. Many other configurations of computing devices and software computing systems may be employed to implement the method of FIG. 2.

Data management system 300 includes communication interface 310, user interface 320, processing system 330, storage system 340, software 350, and buffer 360. Processing system 330 is linked to communication interface 310 and user interface 320. The processing system 330 includes processing circuitry (not shown) and storage system 340 that stores software 350 and buffer 360. Data management system 300 may include other well-known components such as a power system and enclosure that are not shown for clarity. Data management system 300 may be implemented as a single computing system, but may also be implemented in a distributed manner across multiple computing systems. Data management system 300 is provided as an example of a general purpose computing system that, when implementing the method of FIG. 2, becomes a specialized system capable of creating a snapshot from a changed block list.

In at least one example, the communication interface 310 comprises a network card, network interface, pot, or interface circuitry that allows data management system 300 to communication with various storage volumes including primary storage volume 130 and secondary storage volume 140. The communication interface 310 may also include a memory device, software, processing circuitry, or other communication devices as desired. The communication interface 310 may use various protocols, such as host bus adapters (HBA), small computer system interface (SCSI), serial advanced technology attachment (SATA), Fiber Channel, iSCSI, IEEE 802.11 protocols (WiFi), Bluetooth, Ethernet, transmission control protocol/internet protocol (TCP/IP), optical networking, wireless protocols, communication signaling, or the like to communicate with a plurality of storage volumes, including primary storage volume 130 and secondary storage volume 140.

User interface 320 comprises components that interact with a user to receive user inputs and to present media and/or information. User interface 320 may include a speaker, microphone, buttons, lights, display screen, mouse, keyboard, or some other user input/output apparatus—including combinations thereof. User interface 320 may be omitted in some examples.

In at least one example, processing system 330 may include a microprocessor and other circuitry that retrieves and executes software 350 from storage system 340. Processing system 330 may comprise a single device or could be distributed across multiple devices—including devices in different geographic areas. Processing system 330 may be embedded in various types of equipment.

Storage system 340 may comprise any storage media readable by processing system 330 and capable of storing software 350. Storage system 340 may include volatile and non-volatile, removable and non-removable media implemented in any method or technology for storage of information, such as computer readable instructions, data structures, program modules, or other data. Storage system 340 may comprise a single device or could be distributed across multiple devices—including devices in different geographic areas. Storage system 340 may be embedded in various types of equipment. Storage system 340 may comprise additional elements, such as a controller, capable of communicating with processing system 330.

Examples of storage media include random access memory, read only memory, magnetic disks, optical disks, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal or carrier wave.

Software 350 could comprise computer program instructions, firmware, or some other form of machine-readable processing instructions having the method described in FIG. 2 embodied therein. Software 350 could be implemented as a single application but also as multiple applications. Software 350 may comprise stand-alone applications but may also be implemented within other applications distributed on multiple devices, including but not limited to program application software and operating system software.

In general, software 350 may, when loaded into processing system 330 and executed, transform processing system 330, and data management system 300 overall, from a general-purpose computing system into a special-purpose computing system customized to evaluate models generated from objects identified in video and identify preferred models based on the evaluations as described by the method of FIG. 2.

Software 350 may also transform the physical structure of storage system 340. The specific transformation of the physical structure may depend on various factors in different implementations of this description. Examples of such factors may include, but are not limited to, the technology used to implement the storage media of storage system 340, whether the computer-storage media are characterized as primary or secondary storage, and the like.

For example, if the computer-storage media are implemented as semiconductor-based memory, software 350 may transform the physical state of the semiconductor memory when the software is encoded therein. For example, software 350 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Software 350 could comprise computer programs, firmware, or some other form of machine-readable processing instructions. Software 350 may include an operating system, utilities, drivers, network interfaces, applications, or some other type of software. In some examples, software 350 may include the data management module 120 shown in FIG. 1. When executed by processing system 330, software 350 directs processing system 330 to operate data management system 300 as described herein for data management systems.

In operation, processing system 330 receives a command or instruction to initiate an operation on the data items associated with the secondary storage volume. Exemplary operations may include, without limitation, backup operations. In the case of a backup operation, data management system 300 may establish a base state for the secondary storage volume 140. For example, data management system 300 may capture a snapshot of the secondary storage volume 140 to establish the base state for secondary storage volume 140.

Thereafter, changes to the secondary storage volume 140 may be tracked and captured. As changes are made to the data items in the secondary storage volume 140, corresponding changes are made to the primary storage volume 130. Any method may be used to generate a snapshot from the changes made to the data, such as by converting changed block lists into snapshots. In some examples, the changed block list from which the snapshot is created may itself be generated according to the method described above with respect to FIG. 2. Other methods of obtaining changed block lists from which to create snapshots may also be utilized.

At some point, it may be desirable to merge a snapshot of the changes to a base state of a selected storage volume with the base state of the storage volume. For example, it may be desirable to recover some portion of the storage volume in the event of a failure or data loss. In such an example, a snapshot corresponding to the changed block list may be merged with the snapshot of the base state of the storage volume. Merging the snapshot of the base state and the snapshot created from the changed block list creates a full, updated snapshot of the blocks associated with the storage volume. In this example, the base state of the blocks may remain the same while still allowing the updated version of the storage volume and the corresponding data items to be restored to the storage volume. Advantageously, such a process may reduce overhead associated with and time utilized for providing multiple restore points.

Figure 4:
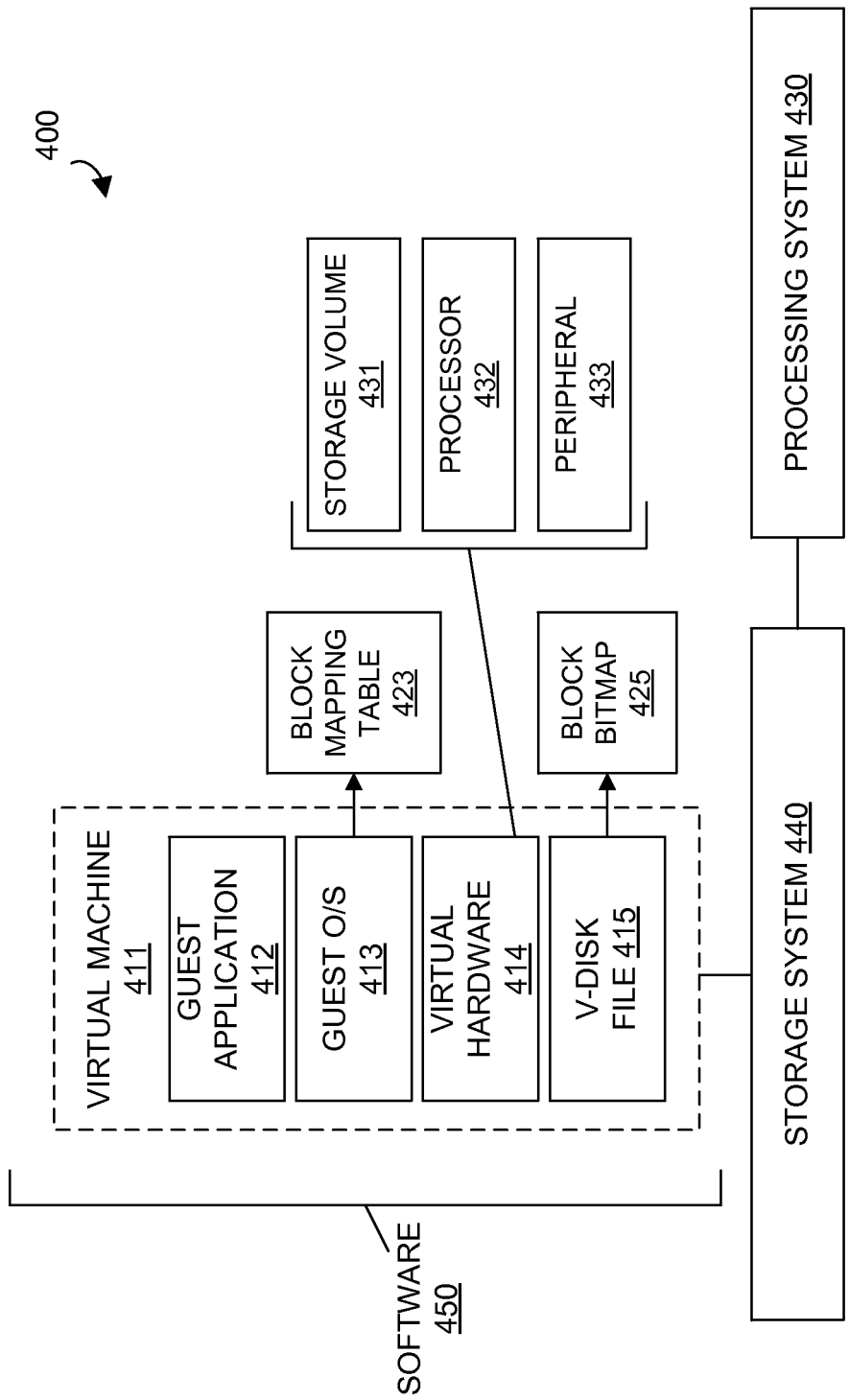
FIG. 4 is a block diagram that illustrates a data management system according to one example.

FIG. 4 is a block diagram that illustrates data management system 400 in another embodiment. Data management system 400 provides an example of data management systems 105 and 300, but systems 105 and 300 could have alternative configurations. In this example, data management system 400 includes processing system 430, storage system 440, and software 450. Software 450 is stored on storage system 440. Processing system 430 executes software 450 to create a synthetic snapshot from a changed block list.

Software 450 includes virtual machine 411. Virtual machine 411 includes guest application 412, guest operating system 413, virtual hardware 414, and virtual disk file 415. Virtual hardware 414 includes virtual storage volume 431, virtual processor 432, and virtual peripheral 433. In some examples, part or all of guest application 412, guest operating system 413, and virtual hardware 414 may be contained within virtual disk file 415.

Guest operating system 413 generates block mapping table 423. Block mapping table 423 describes the storage of a data volume in virtual storage volume 431. Data management system 400 generates block bitmap 425 which describes the storage of the data volume in virtual disk file 415. In this example, virtual disk file 415 comprises a virtual machine disk (VMDK) file format. In some examples, virtual disk file 415 could be referred to as a primary storage volume, while virtual storage volume 431 could be referred to as a secondary storage volume.

In operation, a hypervisor (not shown) executing on processing system 430 loads virtual disk file 415 into physical memory components of storage system 440 in order to launch virtual machine 411. Once virtual machine 411 is up and running, a user may then operate virtual machine 411. For example, the user may employ guest operating system 413 to execute guest application 412. While utilizing guest application 412, the user may save a file generated by guest application 412 to virtual storage volume 431. Typically, guest operating system 413 would update its block mapping table 423 to reflect the changes to the data blocks that occur when saving the file.

When the file is saved to virtual storage volume 431, block bitmap 425 for virtual disk file 415 is also updated to reflect the changes to block mapping table 423. For example, data management system 400 could track changes to virtual disk file 415 to generate a changed block list for virtual disk file 415 and store the changes in block bitmap 425. Block bitmap 425 for virtual disk file 415 is updated by data management system 400 whenever data is written to virtual storage volume 431 and/or changes are made to block mapping table 423 because virtual storage volume 431 and block mapping table 423 are contained within virtual disk file 415 in this example.

A snapshot of changes to a base state of virtual disk file 415 could then be generated by data management system 400 from block bitmap 425. For example, a snapshot of the base state of virtual disk file 415 could have been stored by data management system 400 prior to the user saving the file in virtual storage volume 431. After updating block bitmap 425 in response to data block changes in virtual disk file 415 effectuated by the user saving a file in virtual storage volume 431, data management system 400 could synthesize a snapshot of changes to the base state of virtual disk file 415 using the updated block bitmap 425. In the event of a system failure, data management system 400 could then merge the snapshot of the base state of virtual disk file 415 and the synthetic snapshot of the changed block list from block bitmap 425 to restore a recent state of the virtual disk file 415, which would include the file saved by the user on virtual storage volume 431.

In some examples, the hypervisor that loads virtual disk file 415 to launch virtual machine 411 might not support changed block tracking of virtual disk file 415 in block bitmap 425. In these and other cases, data management system 400 could utilize block mapping table 423 to generate a synthetic changed block list for virtual disk file 415. To achieve this, data management system 400 could first identify changed data items within a secondary storage volume. For example, data management system 400 could monitor block mapping table 423 for changes made by guest operating system 413 to identify changed data items within virtual storage volume 431.

After identifying the changed data items, data management system 400 could correlate entries in block mapping table 423 associated with the changed data items to entries in block bitmap 425 associated with a data storage volume, such as virtual disk file 415. For example, data management system 400 may correlate changed blocks in block mapping table 423 to corresponding blocks in block bitmap 425 for virtual disk file 415.

After the correlating, data management system 400 can then identify changed blocks associated with the entries in block bitmap 425. Data management system 400 can then generate the list of blocks associated with the data storage volume based on the changed blocks. For example, data management system 400 could generate a synthetic changed block list for virtual disk file 415 based on the changed blocks identified in block bitmap 425.

Once the synthetic changed block list for virtual disk file 415 has been generated, data management system 400 can generate a synthetic snapshot of the changes to virtual disk file 415. This synthetic snapshot that was generated from the synthetic changed block list could then be merged with a snapshot of a base state of virtual disk file 415 to recover a recent state of virtual disk file 415, such as during a recovery process as discussed above. Advantageously, other applications that can utilize snapshots can effectively use the synthetic snapshot for their purposes as well.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data management system, the method comprising:
    establishing a base state for a virtual disk file comprising a plurality of blocks;
    identifying changed data items within a virtual drive included in the virtual disk file;
    correlating mapping table entries associated with the changed data items to bitmap entries associated with the virtual disk file;
    identifying changed blocks of the virtual disk file associated with the bitmap entries;
    generating a list of blocks of the plurality of blocks that have changed since establishing the base state based on the changed blocks; and
    creating a snapshot of changes to the base state from the list of blocks.

2. The method of claim 1 further comprising restoring a state for the virtual disk file by merging the snapshot and the base state.

3. The method of claim 1 wherein creating the snapshot comprises synthesizing the snapshot from the list of blocks.

4. The method of claim 1 wherein the virtual disk file comprises a virtual machine disk (VMDK) file format.

5. A data management system comprising:
    a storage system configured to store a virtual disk file comprising a plurality of blocks; and
    a processing system configured to establish a base state for the virtual disk file, identify the changed data items within a virtual drive included in the virtual disk file, correlate mapping table entries associated with the changed data items to bitmap entries associated with the virtual disk file, identify changed blocks of the virtual disk file associated with the bitmap entries, generate a list of blocks of the plurality of blocks that have changed since establishing the base state based on the changed blocks, and create a snapshot of changes to the base state from the list of blocks.

6. The system of claim 5 wherein the processing system is further configured to restore a state for the virtual disk file by merging the snapshot and the base state.

7. The system of claim 5 wherein the processing system configured to create the snapshot comprises the processing system configured to synthesize the snapshot from the list of blocks.

8. The system of claim 5 wherein the virtual disk file comprises a virtual machine disk (VMDK) file format.

9. One or more non-transitory computer-readable media having program instructions stored thereon for operating a data management system wherein the program instructions, when executed by the data management system, direct the data management system to:
    establish a base state for a file comprising a plurality of blocks;
    identify changed data items within a virtual drive included in the virtual disk file;
    correlate mapping table entries associated with the changed data items to bitmap entries associated with the virtual disk file;
    identify changed blocks of the virtual disk file associated with the bitmap entries;
    generate a list of blocks of the plurality of blocks that have changed since establishing the base state based on the changed blocks; and
    create a snapshot of changes to the base state from the list of blocks.

10. The one or more non-transitory computer readable media of claim 9 wherein the program instructions further direct the data management system to restore a state for the file by merging the snapshot and the base state.

11. The one or more non-transitory computer readable media of claim 9 wherein the program instructions, to direct the data management system to create the snapshot, direct the data management system to synthesize the snapshot from the list of blocks.

12. A method of generating a synthetic changed block list, the method comprising:
    establishing a base state for a virtual disk file comprising a plurality of blocks;
    identifying changed data items within a virtual drive included in a virtual disk file;
    correlating mapping table entries associated with the changed data items to bitmap entries associated with the virtual disk file;
    identifying changed blocks of the virtual disk file associated with the bitmap entries
    generating the synthetic changed block list based on the changed blocks; and
    creating a snapshot of changes to the base state from the list of blocks.

* * * * *